United States Patent
Martin et al.

(10) Patent No.: US 10,460,263 B1
(45) Date of Patent: Oct. 29, 2019

(54) POOLING NETWORK DEVICES

(71) Applicant: Sprint Communications Company L.P., Overland Park, KS (US)

(72) Inventors: Geoffrey Scott Martin, Overland Park, KS (US); Michael Philip Dougan, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 182 days.

(21) Appl. No.: 15/656,182

(22) Filed: Jul. 21, 2017

Related U.S. Application Data (62) Division of application No. 13/358,267, filed on Jan. 25, 2012, now Pat. No. 9,760,843.

(51) Int. Cl.
*G06F 15/16* (2006.01)
*G06Q 10/02* (2012.01)

(52) U.S. Cl.
CPC .................................. *G06Q 10/02* (2013.01)

(58) Field of Classification Search
CPC ....................................................... H04Q 7/00
USPC .......................................................... 705/34
See application file for complete search history.

(56) References Cited

U.S. PATENT DOCUMENTS

| | | |
|---|---|---|
| 2007/0263549 A1 | 11/2007 | Brinkley |
| 2009/0191857 A1 | 7/2009 | Horn et al. |
| 2012/0317166 A1* | 12/2012 | Schleifer ............. H04L 67/2814 709/202 |

OTHER PUBLICATIONS

"Carrier IQ" 2011 Carrier IQ, Inc. Accessed Jan. 18, 2012. http://www.carrieriq.com/index.htm.
"Words With Friends" 2012 Newtoy, Inc. Accessed Feb. 1, 2012. http://www.wordswithfriends.com/.

* cited by examiner

*Primary Examiner* — Russell S Glass (57) ABSTRACT

A method, system, and medium are provided for pooling network devices and updating service plans in a wireless network. The system includes at least one base station and network devices that are part of a wireless network. The base station is configured to group network devices based on a location identifier of each network device. The base station may pool network resources of network devices in each group. The base station, in turn, updates the service plans for customers having addresses that correspond to the location identifiers to reflect the grouped network devices and the pooled resources.

20 Claims, 4 Drawing Sheets

POOLING NETWORK DEVICES

CROSS REFERENCE

This application is a divisional of U.S. application Ser. No. 13/358,267 filed on 25 Jan. 2012, the entirety of which is incorporated by reference herein.

SUMMARY

A high-level overview of various embodiments of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, ways to group network devices having machine-to-machine components (M2M) and update service plans associated with network devices.

The network devices may be connected to a wireless network having at least one base station. In some embodiments, the base station is configured to receive a location from network devices that connect to it via a wireless network. In turn, the base station may determine groups based on the locations received from the network devices. In each group, the network devices share a common geographic location. The base station may identify customers associated with the common geographic locations for each group. The network resources for each network device in a group may be pooled by the base station. The pooled network resources may be shared by each network device in the group. The base station may modify billing records associated with a customer to reflect the groups that are associated with the customer. In some embodiments, the groups are created dynamically and network devices that are outside a boundary associated with a common geographic location are not included in the group.

BRIEF DESCRIPTION OF THE SEVERAL VIEWS OF THE DRAWINGS

Illustrative embodiments of the invention are described in detail below with reference to the attached drawing figures, and wherein.

DETAILED DESCRIPTION

The subject matter of the patent is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Embodiments of the invention are directed to network devices configured with M2M components. The network devices may include wireless devices, home appliances, washers, dryers, consumer electronics, televisions, digital signs, vending machines, vehicle or shipment tracking devices, digital books, image and video recorders, hand-held scanners, etc. The M2M component may include communication interfaces, storage, and processors for executing instructions. The M2M component provides the network devices with access to several communication networks, including a personal area network and wireless network. When connected to the wireless network, a base station is configured to monitor the network devices.

The base station may also be configured to update billing records based on groups that are dynamically formed based on the location of the network devices. The M2M component on the network device may request that the networked device be included in a group of the network devices. The base station, in turn, determines whether the location of the network device is within a boundary of the other network devices. When the network device is within the boundary, the base station updates the group to include the network device with the other network devices. In certain embodiments, the network device is also assigned an identifier associated with the group by the base station. The group may be associated with a service plan that covers network devices that are in close proximity to each other. Accordingly, the network devices in the group are configured to share network resources that are pooled by the base station.

For instance, a fast food restaurant, like FOONOW, may install digital signage having M2M components. The digital signage may present high-tech menu boards both behind the counter and outside at a drive-through window for each FOODNOW location. Some stores need four digital signs, some need five digital signs, and others need more than 6 digital signs.

The digital signs at the FOONOW restaurants may utilize the M2M components to identify current locations of the digital signs and to report the current locations to base stations on a wireless network. Too meet budget predications, corporate headquarters for FOODNOW may limit every store to the same monthly expenditure, e.g. $100, for wireless services associated with all of the digital signs up to a specific threshold number, e.g., seven, associated with each store. Once a base station associated with the digital signs for a particular store receives the location and determines that digital signs at one or more FOONOW restaurants reached the specific threshold number, the base stations may cause any additional digital signage added to the restaurants to operate independent of the other digital signs.

In certain embodiments, the M2M components in the digital signs may detect proximity of each other within a boundary. The base station may identify the boundaries of each property of the FOODNOW restaurant and share pooled network resources associated with each digital sign up to the specific threshold.

Accordingly, the base stations on the wireless network and the M2M components may simplify installation and management of the digital signs. FOODNOW restaurants may utilize the base stations to dynamically group multiple digital signs into specific billing plans associated each FOODNOW restaurant based on the locations of the digital signs and their relative proximity to each other. FOODNOW restaurants may no longer receive separate wireless service billing records for each new digital sign that is added up to the threshold limit. Instead, the billing record may include each digital sign based on groups formed by the base stations for each FOODNOW restaurant.

Throughout this patent, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the embodiments of the invention. The following is a list of these acronyms:

ATM Automated Teller Machine
BTS Base Transceiver Station
CDMA Code Division Multiple Access
CD-ROM Compact Disc, Read Only Memory
DVD Digital Versatile Disc
EEPROM Electrically Erasable Programmable Memory
ESN Electronic Serial Number
GPRS General Packet Radio Service
GPS Global Positioning System
GSM Global System for Mobile communications (Groupe Special Mobile)
ID Identifier
IP Internet Protocol
IPv4 Internet Protocol Version Four
IPv6 Internet Protocol Version Six
LED Light Emitting Diode
LTE Long Term Evolution
M2M Machine-to-Machine
NFC Near-Field-Communication
PDA Personal Data Assistant
RAM Random Access Memory
ROM Read Only Memory
RNC Radio Network Controller
TDMA Time Division Multiple Access
UMTS Universal Mobile Telecommunications System
USB Universal Serial Bus
Wi-Fi Wireless Fidelity
WiMAX Worldwide Interoperability for Microwave Access Embodiments of the invention can take the form of a method, sever, network device, system, or computer-readable media embodied with a specific set of computer-executable instructions. Computer-readable media include both volatile and nonvolatile media, removable and nonremovable media, and contemplate media readable by a database, a switch, and various other network and computing devices. Computer-readable media include communication media and computer storage media implemented in any method or technology that stores information. Examples of stored information include computer-useable instructions, data structures, program components, and other data representations. Examples of computer-readable media include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

In one embodiment, the network device is configured with several input and output components. Additionally, an M2M component may be installed in the network device. The M2M component may include applications for communicating with different networks. The M2M component may utilize the input and output component of the network device to implement operations requested by the applications of the M2M component. The M2M component may allow the network device to switch between communication networks maintained by disparate carriers. The network device having the M2M component may also be configured to periodically provide usage information and location information to a base station on a wireless network.

Figure 1:
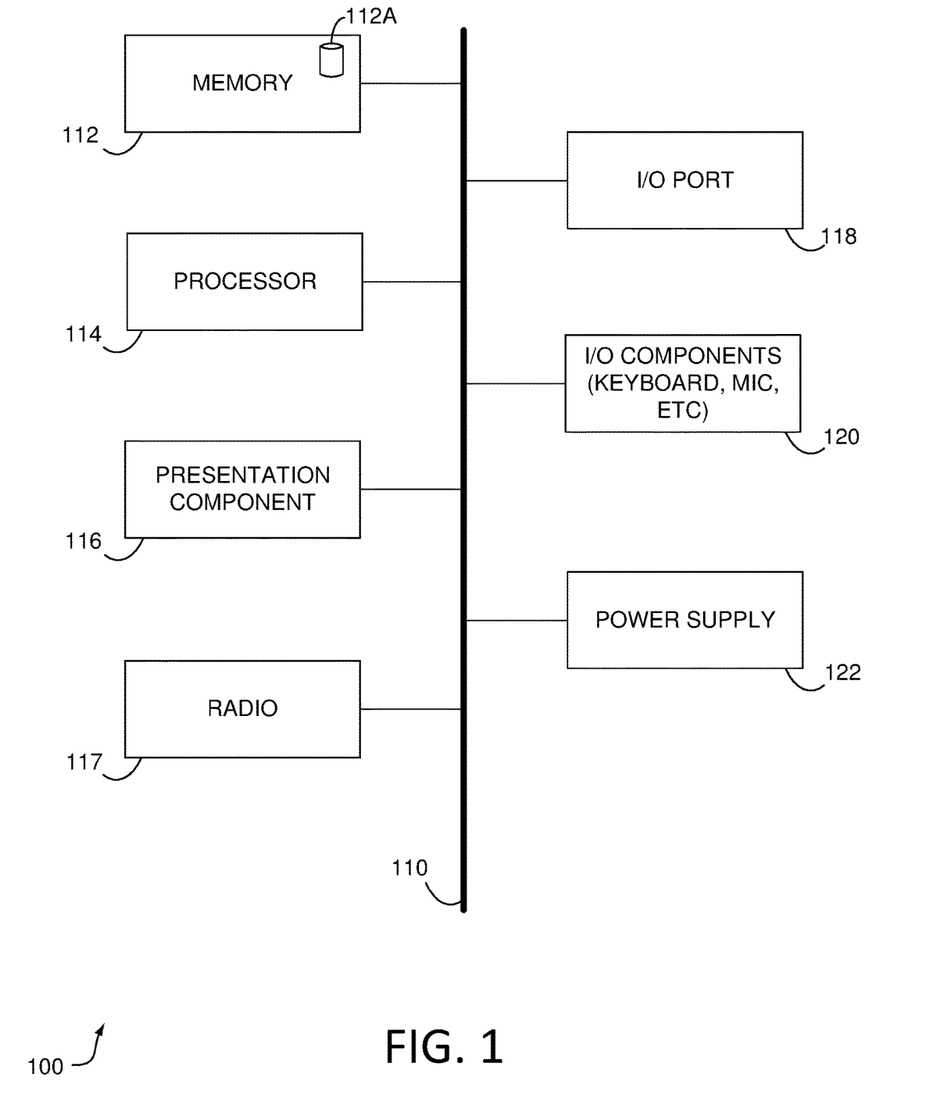
FIG. 1 depicts a block diagram of an exemplary network device in accordance with embodiments of the invention.

FIG. 1 depicts a block diagram of an exemplary network device in accordance with embodiments of the invention. Turning now to FIG. 1, a block diagram of an illustrative network device is provided and referenced generally by numeral 100. Although some components are shown in the singular, they may be plural. For example, network device 100 might include multiple processors or multiple radios, etc. A network device 100 may be one of many devices, including, but not limited to, a wireless phone, vending machine, video and image capture device, digital sign, television, a laptop, a PDA, a handheld device, smart meters, handheld scanners, vehicle tracking components, e-books, ATMs, consumer electronics, etc. As illustratively shown, network device 100 includes a bus 110 that directly or indirectly couples various components together including memory 112, a processor 114, a presentation component 116, a radio 117, input/output ports 118, input/output components 120, and a power supply 122.

We previously have described various memory components what memory 112 might take the form of. Memory component 112 can include any type of medium that is capable of storing information (e.g., a database 112A). The database 112A may be configured to store provisioning credentials, including a network identifier; a group identifier, pool identifier age or usage associated with the network device 100 in a wireless network; location information based on GPS and any information that the network device transmits to the wireless network. The database 112A may also store applications associated with a M2M component installed on the network device 100. Processor 114 might actually be multiple processors that receive instructions associated with the applications and process the instructions accordingly. Presentation component 116 includes the likes of a display, a speaker, as well as other components that can present information (such as a lamp (LED), or even lighted keyboards) associated with the outputs of applications or other components of the network device.

The M2M component utilizes the communication interfaces of network device 100 to communicate with network devices or a base station on the communication network. In an embodiment, an application on the M2M component reports statistics, including, but not limited to, location, age of wireless device, ESN, signal strength, battery power, usage patterns of the wireless device, etc. The statistics may be stored in the database 112A by the M2M component. Once the statistics are collected, the M2M component may transmit them from the network device 100 to at least one base station on the wireless network. In turn, the base station may determine whether a pool is available for the network device 100. If it's determined that a pool is available, the base station may group the network device 100 with other network devices in the pool. The network device 100 may be assigned a group identifier by the base station. In turn, the network device may be configured to operate in pool mode by the M2M component. Once in pool mode, the network device may access the network resources associated with the pool. If it's determined that a pool is unavailable, the network device 100, may be configured to operate in independent mode until a pool is identified by the base station.

In some embodiments, the network resources on the wireless communication network may be bandwidth, airtime minutes available to a network device, a remote server like multimedia servers or short message servers, a database, or multimedia content available at different websites. The communication interface of the network device 100 may be a radio 117 that facilitates communication with a wireless telecommunications network. Illustrative wireless telecommunications technologies include CDMA, GPRS, TDMA, GSM, WIMAX, LTE, UMTS, and the like. In some embodiments, radio 117 might also facilitate other types of wireless communications including Wi-Fi communications, Bluetooth™, Zigbee, or other near-field communication.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into network device 100. Power supply 122 includes items such as batteries, fuel cells, or any other component that can act as a power source to power network device 100.

Accordingly, a network device 100 may be grouped based on the statistics associated with the network device. The network device 100 may report statistics to a base station, which may select an appropriate group for the network device 100. It will be understood and appreciated by those of ordinary skill in the art that the network device 100 shown in FIG. 1 is merely an example of one suitable network device 100 and is not intended to suggest any limitation as to the scope of use or functionality of the embodiments of the invention. Neither should the network device 100 be interpreted as having any dependency or requirement related to any single component or combination of components illustrated therein. The single unit depictions are meant for clarity, not to limit the scope of embodiments in any form.

In some embodiments, a base station on the wireless network selects network devices that could be grouped based on statistics like location or network identifier. The network device reports the location or network identifier to the base station. In turn, the base station manages network resources available to the network devices that are part of the same group based on the statistics. Moreover, the base station may update billing records for one or more customers that are associated with the network devices in each of the groups identified by the base station.

Figure 2:
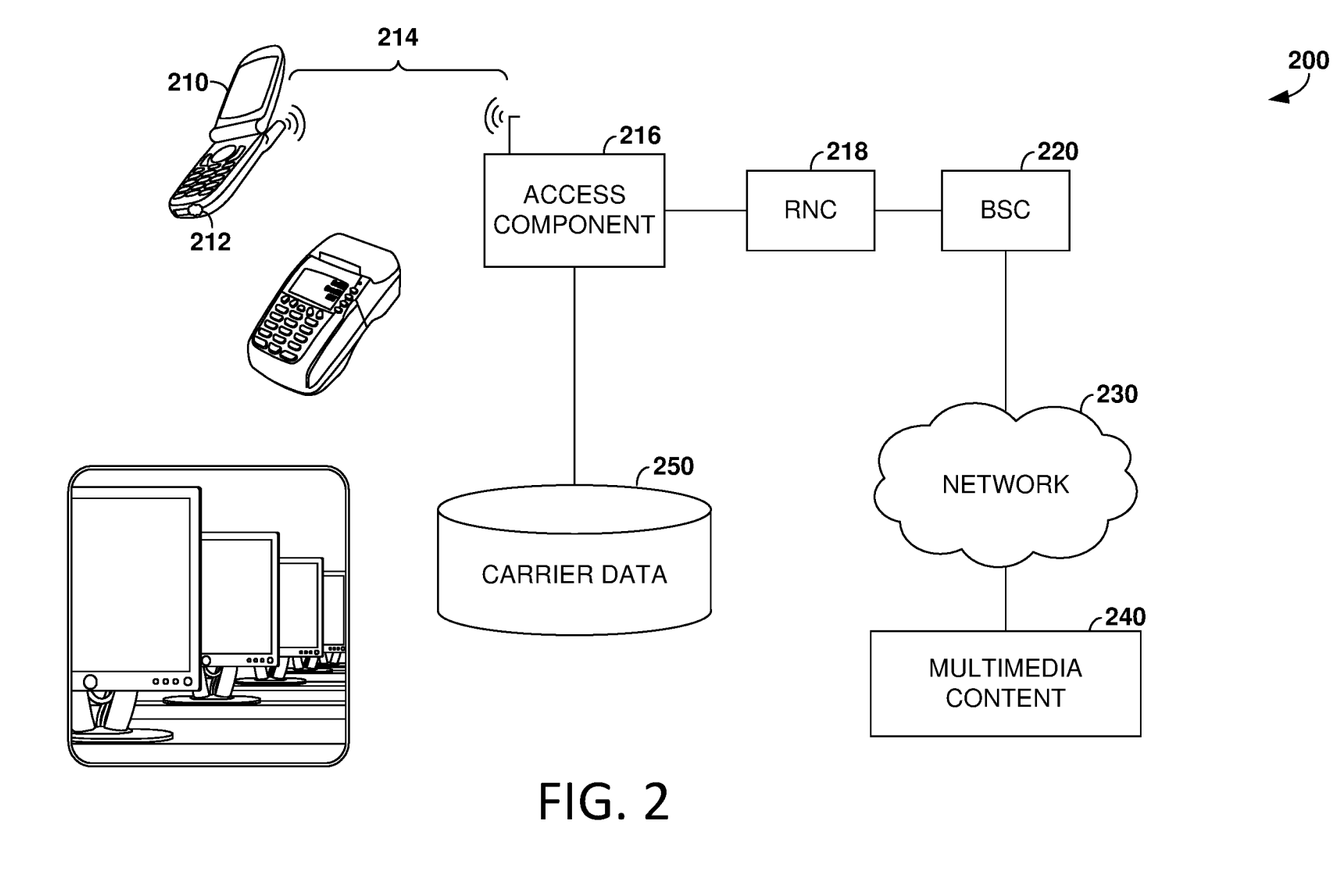
FIG. 2 depicts a network diagram of an exemplary communication system in accordance with embodiments of the invention.

FIG. 2 depicts a network diagram of an exemplary communication system 200 in accordance with embodiments of the invention. Turning now to FIG. 2, an illustrative computing system 200 is provided and referenced generally by the numeral 200, which depicts an illustrative operating environment for identifying at least one network device 210 that could be could be placed in a group. The computing system 200 may include a network device 210, access components 216, RNC 218, BSC 220, network 230, multimedia content 240, and carrier database 250.

Network device 210 executes a M2M application 212 that shares statistics associated with the device. In one embodiment, the M2M application 212 monitors statistics like a location of the network device, a network identifier for the network device, an age of the network device 210, and usage patterns of the network device 210. In turn, the M2M application 212 may transmit the statistics to a BSC 220. In some embodiments, the network device 210 is grouped with other network devices based on the shared statistics. The network device 210 may utilize network resources in a pool available to some other network devices 210 in the group when accessing the wireless network. In certain embodiments, the network devices may be grouped based on a range associated with the network device's near-field channel like Bluetooth or a personal area network. In other words, a boundary associated with group of network devices may overlap with range for the near-field channel. When a non-group member device is within range, it may be identified, in one embodiment, as a potential group member by the other network devices in the group. In turn, the other network devices may inform the BSC 220 of the non-group member. The BSC 220 may add the non-group member in group if space is available as dictated by a service plan that covers the group.

Network devices 210 may communicate among themselves over a near-field channel to determine when a non-member is within range. The group members may be identified by a group identifier that is included in messages delivered by each network device 210 in the same group. In one embodiment, the network device 210 that could be placed in the group is identified and reported by the at least one network device in the group. The non-group member network device 210 may be identified in the database 250 and provided with a group identifier. In another embodiment, the network devices 210 in the same group may pool resources. For instance, each network device 210 may have individual plans, where each plan may be pooled by combining all capabilities, e.g., minutes, bandwidth, text messaging, any other service for the network devices that are part of the same group. The base station may dynamically, add or remove network devices 210 based on service plan limits or changes in location associated with the grouped network devices.

In some embodiments, the database 250 stores statistics monitored by the network device 210. The database 250 stores an identifier for each network device. The identifier may be an ESN or telephone number associated with the network device 210. The database 250 may associate the identifier with the statistics received for the corresponding network device. The statistics may include both device metrics and network metrics. The device metrics include location, age, temperature, battery power, antennae orientation, location, memory usage, etc. The network metrics include signal strength, interference, bandwidth, ESN, usage patterns etc. Based on a combination of the device and network metrics, the network devices 210 are grouped together. The database 250 may also store, in certain embodiments, network credentials, e.g. group IDs, for network devices; service plans corresponding to the network devices; and discounts applied to accounts for users of the network devices.

Network device 210 communicates with an access component 216 by way of a communication link 214. Communication link 214 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi connection to a device (e.g., wireless hotspot) that provides access to a wireless communications network, such as a WLAN connection using 802.11 protocol. A long-range connection may include a connection using one or more of CDMA, GPRS, GSM, TDMA, and 802.16.

Generally, the access component 216 provides access to what some skilled artisans refer to as a wireless communications network 230. The access component 216 may be one or more of a base transceiver station (BTS) tower, a Wi-Fi Router, and any other device that facilitates communication between network device 210 and network 230. In one embodiment, the access component 216 includes both a Wi-Fi Router and a BTS tower. In another embodiment, access component 216 is a BTS tower. A radio network controller (RNC) 218 performs various functions, such as managing radio channels, power control, load control, admission control, packet scheduling, handover control, macrodiversity, security functions, and mobility management. A base station controller (BSC) 220 is also shown in FIG. 2. The BSC 220 acts as the intelligence behind base transceiver stations (BTS) (not shown), and handles allocation of radio channels, receives statistics from the network devices 210, and controls handovers from one BTS to another BTS. In one embodiment, the BSC 220 may group one or more network devices 210 based on the statistics associated with the network devices.

The components illustrated in FIG. 2, such as those that may be included in a wireless communications network 230 comprise network resources and multimedia content 240 accessible via the wireless communications network 230. The wireless communication network 230 may be utilized by the BSC 220 to receive statistics and network credentials (e.g., user name, passwords, private keys, group IDs, etc.) from network devices 210. Some network devices may not store their credentials in the database 250 but retain the data on a local storage only for access by the BSC 220. The network 230 may be an IP network operating one or both of IPv4 and IPv6. The multimedia content 240 may include websites, videos, applications, etc. that are accessible by the network devices 210.

The illustrated elements of computing system 200 are meant to be exemplary in nature, and the various lower-level details of the elements are not elaborated on so as to not obscure the embodiments of the invention. Clearly, some of the elements may be absent in some embodiments of the invention, and additional elements not shown may also be part of computing system 200. Attempting to show all of the various elements of computing system 200 would obscure certain novel aspects, and we will refrain from such elaboration at least for the sake of brevity.

A remote server, e.g., BSC, periodically identifies, the network devices on the wireless network that could be grouped together. The identification of the network device may based on several statistics including, but not limited to: location, age, usage, movement, proximity, weather conditions, physical obstructions, interfering radio frequencies. Upon identifying the network devices, the devices on the wireless network are grouped and the corresponding network resources are pooled.

Figure 3:
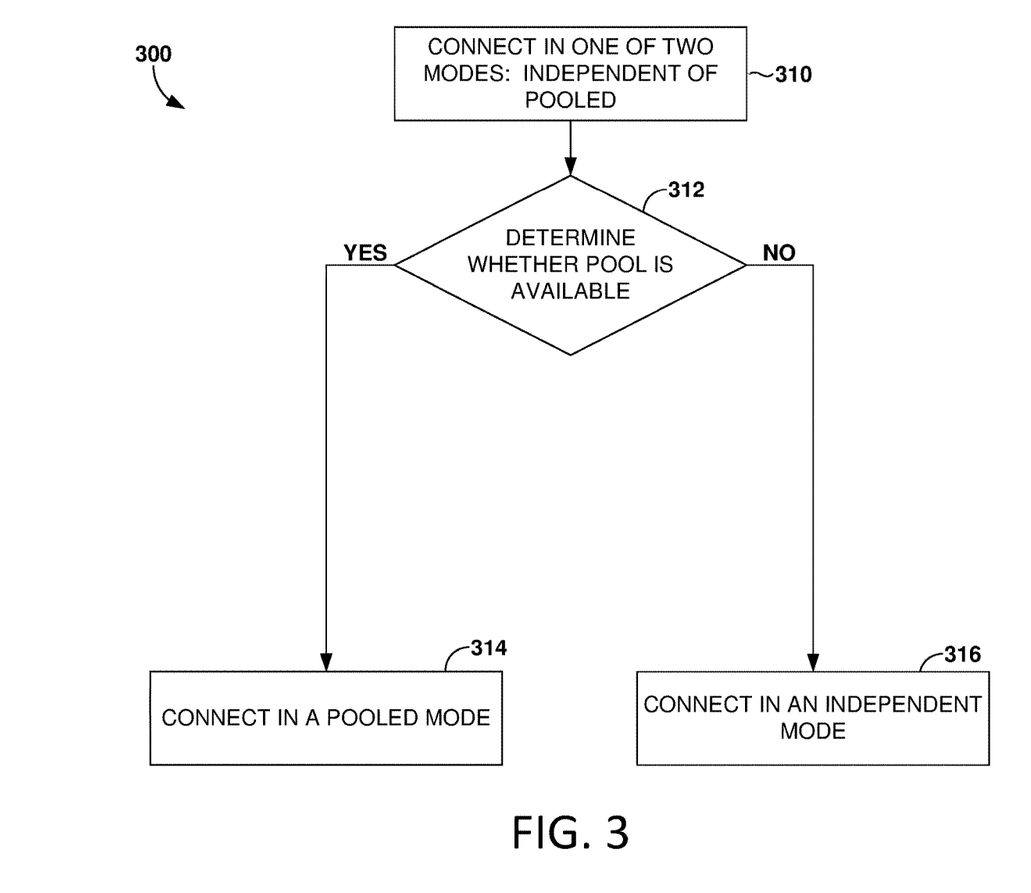
FIG. 3 depicts an exemplary logic diagram for configuring network devices in accordance with embodiments of the invention.

FIG. 3 depicts an exemplary logic diagram for configuring network devices in accordance with embodiments of the invention. Turning now of FIG. 3, in step 310, an M2M component in the network device may connect the device to a wireless network in one of two modes: independent or pooled. In the step 312, the network device may determine whether a pool of network devices is available based on the location of the pool of network devices and the location of the network device. In some embodiments, the pool of network devices provides pooled resources associated with network devices situated in a common geographic location. The pool may include the resources of each network device within a boundary. The boundary of the common geographic location may be established by any combination of: a range of a near field communication channel of the network devices in the group or a property lot description that corresponds to a customer billed for the pool of network devices.

When the pool is available, in step 314, the network device may connect to the wireless network in pooled mode. The pooled mode, in some embodiments, allows the network devices to aggregate resources available to each network device in the pool. Additionally, the pooled mode may allow each network device to be billed to a customer associated with a common location of the network devices in the pool. For instance, the customer having devices in pooled mode may be billed at a discounted rate as compared the customer of network device that operate in the independent mode.

When the pool is unavailable, the network device may connect to the wireless network in an independent mode, in step 316. The independent mode of operation may incur a customer a higher billing charge per megabyte or per minute for a customer of the network device than the pooled mode.

As explained above, the network device may be configured in either an independent mode or a pooled mode. The network devices that operate in pooled mode connect to a base station and may access network resources available to other network devices in the pool. The network devices that operate in independent mode connect to the base station but may not access network resources available to other network devices via a pool.

In yet another embodiment, a base station receives location identifiers from network devices. In turn, the base station groups the network devices based on at least the location identifiers. The base station may correlate the location of a customer's premise with location information received from the M2M components in the network devices to identify the groups. In some embodiments, a base station may establish parameters for the size of the proximity range utilized to identify network devices that should be in a group. For instance, the base station may set a boundary that is commensurate with a property lot description associated with a property used by a customer. The range can be determined by various methods including, but not limited to: GPS coordinates, cell tower triangulation, and NFC transmission tolerances. In turn, the base station pools the network resources for the network devices in each group. The base station, in one embodiment, may generate pool identifiers based on coordinates, e.g., latitude and longitude, for the group. If needed, the billing record for customers assigned to a group of network devices is updated to reflect the network devices and network resources that are available in the group.

Figure 4:
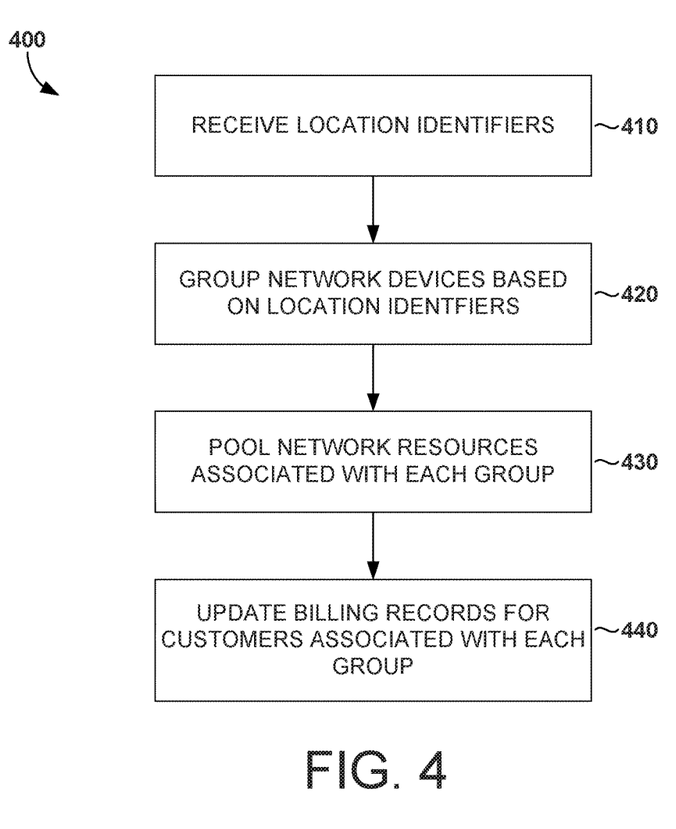
FIG. 4 depicts an exemplary logic diagram for modifying service plans in accordance with embodiments of the invention.

FIG. 4 depicts an exemplary logic diagram for modifying service plans in accordance with embodiments of the invention. Turning now to FIG. 4, in step 410, the access component, e.g., base station controller receives location identifiers from several network devices. In step 420, the network devices are grouped, by the base station, based on the location identifiers.

In some embodiments, grouping network devices based on the location identifiers creates relationships between network devices that are within the defined proximity. The relationships may include any combination of: sibling, parent, or child. Each network device in the group may be assigned a shared group identifier or pool identifier. The network devices may be any of the following: digital signs with M2M components or televisions with M2M components.

The network devices may be grouped based on a defined proximity by the base station. In an embodiment, the network devices are grouped based on being within a range associated with a near-field communication channel generated by each of the network devices. The base station may remove one or more network devices from the group when the one or more network device are no longer within a range associated with the near-field communication channel. Likewise, the base station may add one or more network devices to the group when the one or more network devices are within a range associated with the near-field communication channel.

The base station may retrieve billing records having a service plan associated with the customers. The base station may parse the service plan to identify a limit on the number of network devices that may be associated with the customer at a location corresponding to the group and the added network device. Thus, in at least one embodiment, before adding one or more network devices to the group, the base station may check the limit and reject the one or more network devices when the limit for the customer is reached.

The base station may, in step 430, pool available network resources associated with each network device in the groups. In turn, billing records may be updated, by the base station, to indicate each group of network devices belongs to one or more customers associated with addresses that corresponds to the location identifiers for each group of network devices, in step 440. The base station may update the billing records to reflect the pooled network resources that include an aggregate of the service maximums associated with each of the network devices in the group.

Thus, as a user's M2M component and devices move, the base station updates its records for the groups and corresponding pools. Using Near-field communication and program logic, each M2M module on the network devices may detect near-by network devices. The base station may allow all devices within a set proximity to form groups, where network resources, like bandwidth maximums, are aggregated and shared with each network device in the group. In some embodiments, the network devices may establish a point-to-point connection that, once broken by leaving the set proximity, would eliminate that network device from the group, pool, or service plan. The network device that leaves the group may operate independently and have its own dedicated plan until or unless it returns into the range of the grouped network devices.

In summary, embodiments of the invention allow a network device to move from an independent mode to a pooled mode based on factors like proximity to a specific location associated with a customer. In the independent mode, the network device is provisioned devices and may incur a casual rate at the base station for each communication on the wireless network. In the pooled mode, the network devices are provisioned and are within a proximity of each other. Also, the network devices are within a specific location associated with the customer. In one embodiment, the network devices may detect other network devices within a boundary of the specific location up to a limit established by the customer. The additional devices are included in the group and may operate as non-billing provisioned device. Thus, in most instances, operating several devices in pooled mode as opposed to independent mode may save the customer resources, funds, and personnel time. Because the billing platform for the base station, among other things, dynamically associates and disassociates devices in a group based on the physical proximity.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The technology claimed is:

1. A computer-implemented method for pooling network devices, the method comprising:
    connecting a wireless device having a machine-to-machine (M2M) component to a wireless network, wherein the connecting comprises:
        (i) determining whether a pool of network devices is available, wherein availability is determined using a location of the wireless device relative to a defined proximity of the pool of network devices;
        (ii) when the pool is unavailable based on the wireless device not being within the defined proximity to the pool, connecting the wireless device to the wireless network in an independent mode; and
        (iii) when the pool is available based on the wireless device being within the defined proximity to the pool, connecting the wireless device to the wireless network in a pooled mode,
    wherein the wireless network allocates respective communication resources for use by the wireless device and by each network device in the pool, and wherein when the wireless device is connected to the wireless network in the pooled mode, the respective communication resources allocated for use by the wireless device and the respective communication resources allocated for use by each network device in the pool are aggregated for sharing by the wireless device and by each network device in the pool.

2. The method of claim 1 further comprising:
    communicating a request to a base station to add the wireless device having the M2M component to the pool of network devices.

3. The method of claim 2 further comprising:
    communicating location information of the wireless device having the M2M component to the base station, the location information to be used by the base station in determining whether to add the wireless device to the pool of network devices.

4. The method of claim 1 further comprising:
    monitoring at least one of an age, signal strength, battery power, or usage pattern of the wireless device having the M2M component, wherein the M2M component performs the monitoring; and
    communicating the at least one of an age, signal strength, battery power, or usage pattern of the wireless device having the M2M component to a base station.

5. The method of claim 1, wherein determining whether the pool of network devices is available comprises:
    detecting whether at least one of the network devices in the pool is within a defined proximity of the wireless device having the M2M component.

6. The method of claim 1, further comprising, when the pool is available based on the wireless device being within the defined proximity to the pool:
configuring the wireless device having the M2M component to operate in the pooled mode, wherein the M2M component performs the configuration.

7. The method of claim 1 further comprising:
when the wireless device having the M2M component is connected to the wireless network in the pooled mode, assigning the wireless device having the M2M component to a customer billing plan associated with the pool of network devices.

8. The method of claim 1 further comprising:
when the wireless device is connected to the wireless network in the pooled mode, updating a customer billing plan for the pool to include the wireless device at a discounted rate.

9. The method of claim 1, further comprising:
referencing a boundary that defines a geographic location, wherein the boundary is used to determine whether the wireless device is a candidate for inclusion in the pool of network devices for sharing the aggregated communication resources.

10. The method of claim 9, wherein the boundary is a range of a near-field channel of one or more of the network devices in the pool.

11. A machine-to-machine (M2M) component of a wireless device, the M2M component configured to, via a processor coupled to one or more memories:
when connection of the wireless device to a wireless network is initiated:
(i) determine whether a pool of network devices is available, wherein availability is determined using a location of the wireless device relative to a defined proximity of the pool of network devices;
(ii) connect the wireless device to the wireless network in an independent mode when the pool of network devices is unavailable based on the location of the wireless device not being within the defined proximity to the pool; and
(iii) connect the wireless device to the wireless network in pooled mode when the pool of network devices is available based on the location of the wireless device being within the defined proximity to the pool,
wherein the wireless network allocates respective communication resources for use by the wireless device and by each network device in the pool, and wherein when the wireless device is connected to the wireless network in the pooled mode, the respective communication resources allocated for use by the wireless device and the respective communication resources allocated for use by each network device in the pool are aggregated for sharing by the wireless device and by each network device in the pool.

12. The M2M component of the wireless device of claim 11 further configured to:
configure the wireless device to operate in the pooled mode when the pool of network devices is available based on the location of the wireless device being within the defined proximity to the pool, wherein the M2M component performs the configuration; and
use the aggregated communication resources of the pool when the wireless device is connected to the wireless network in a pooled mode.

13. The M2M component of the wireless device of claim 12 further configured to:
when a base station dynamically determines to remove the wireless device from the pool, re-configure the wireless device to operate in the independent mode, wherein the M2M component performs the re-configuration, and
wherein the base station dynamically determines removal based on:
(A) the location of the wireless device no longer being within the defined proximity to the pool; or
(B) a number of devices allowed in the pool under a customer billing plan being met or exceeded.

14. The M2M component of a wireless device of claim 13 further configured to:
when the location of the wireless device changes, communicate an updated location to the base station.

15. The M2M component of a wireless device of claim 10 is further configured to, when the defined proximity is a near-field communication range of the wireless device:
detect one or more network devices in the pool that are within the near-field communication range of the wireless device; and
establish a point-to-point connection between the wireless device and the one or more network devices in the pool that are within the near-field communication range of the wireless device.

16. The M2M component of a wireless device of claim 15, further configured to:
tear down the point-to-point connection between the wireless device and the one or more network devices in the pool when it is determined the one or more network devices are not within the near-field communication range of the wireless device.

17. The M2M component of a wireless device of claim 11, further configured to:
communicate the location of the wireless device to a base station; and
receive a shared group identifier for the pool, assigned by the base station, when the wireless device is connected to the wireless network in a pooled mode, wherein the shared group identifier acts as a provisioning credential for the wireless device.

18. The M2M component of a wireless device of claim 11, wherein the communication resources are defined by a customer billing plan that governs all of the network devices in the pool.

19. The M2M component of a wireless device of claim 11, wherein the network devices include one or more of a digital sign with M2M components or a television with M2M components.

20. A system for pooling network devices, the system comprising:
a base station that provides a wireless network; and
a machine-to-machine (M2M) component of a wireless device, wherein the M2M component:
(i) determines whether a pool of network devices is available, wherein availability is determined using a location of the wireless device relative to a defined proximity of the pool of network devices;
(ii) connects the wireless device to the wireless network provided by the base station in an independent mode when the pool of network devices is unavailable based on the location of the wireless device not being within the defined proximity to the pool; and
(iii) connects the wireless device to the wireless network provided by the base station in a pooled mode when the pool of network devices is available based on the location of the wireless device being within the defined proximity to the pool, wherein the base station allocates respective communication resources for use by the wireless device and by each network device in the pool, and wherein when the wireless device is connected to the wireless network in the pooled mode, the respective communication resources allocated for use by the wireless device and the respective communication resources allocated for use by each network device in the pool are aggregated by the base station for sharing by the wireless device and by each network device in the pool.

* * * * *